C. J. DE COSTER.
WINDING MECHANISM FOR STRANDS.
APPLICATION FILED OCT. 25, 1918.
1,429,493.
Patented Sept. 19, 1922.
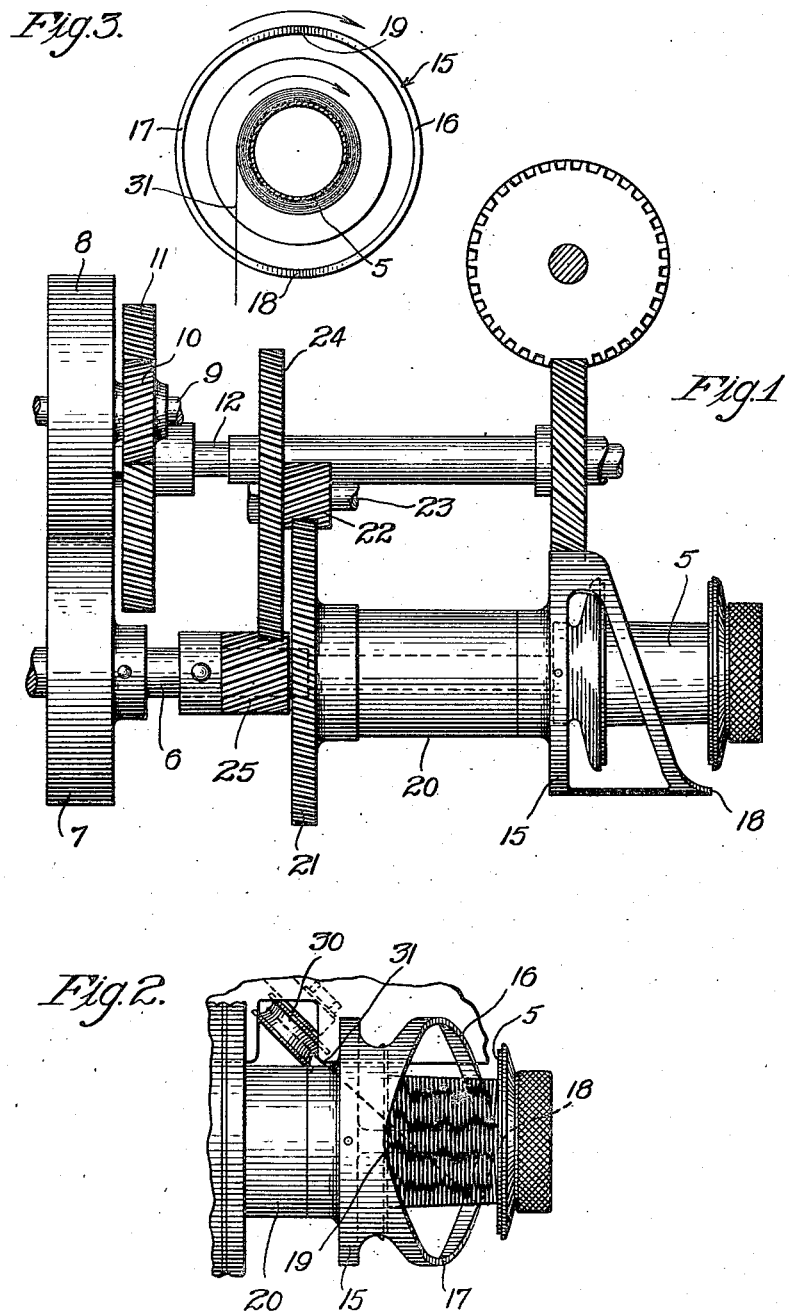
Inventor
Charles J. DeCoster Patented Sept. 19, 1922.

1,429,493

UNITED STATES PATENT OFFICE.

CHARLES JOHN DE COSTER, OF PHILADELPHIA, PENNSYLVANIA, ASSIGNOR TO WESTERN ELECTRIC COMPANY, INCORPORATED, OF NEW YORK, N. Y., A CORPORATION OF NEW YORK.

WINDING MECHANISM FOR STRANDS.

Application filed October 25, 1918. Serial No. 259,700.

*To all whom it may concern:*

Be it known that I, CHARLES J. DE COSTER, a citizen of the United States, residing at Philadelphia, in the county of Philadelphia and State of Pennsylvania, have invented certain new and useful Improvements in Winding Mechanism for Strands, of which the following is a full, clear, concise, and exact description.

This invention relates to winding mechanism for strands, and has for its object to provide a mechanism by means of which cords or strands may be wound upon a take-up reel or spool in smooth, even layers and at a very high rate of speed.

In accordance with the general features of this invention, there is provided spooling mechanism which is adapted to guide the cord or strand upon the take-up reel or spool without reversals in its direction of movement, thereby eliminating sudden stops and starts which would be likely to break cords or strands of low tensile strength when being wound at a high rate of speed. Preferably the spooling attachment comprises a device provided with a single guiding surface which surrounds the take-up reel or spool and is adapted to be rotated at a speed less than the speed of the take-up reel or spool. The cord or strand is led to the take-up reel or spool at such an angle to its periphery that it will always be pulling against the guiding surface of the spooling device.

In the drawings illustrating this invention—

Fig. 1 is a view in side elevation of the spooling device showing its relation to a winding spool and the driving mechanism therefor;

Fig. 2 is a plan view of the spooling device illustrating also the manner in which the cord or strand is led onto the spool, and Fig. 3 is an end view of the spooling device with the spool in section.

As shown in the drawings, 5 designates a take-up reel or spool which is carried by a spindle 6 upon which is mounted a friction roller 7 adapted to be driven by a second friction roller 8. The friction roller 8 is carried by a shaft 9 upon which is mounted a pinion 10 in engagement with a gear 11 carried by a shaft 12 which may be driven from any suitable source of power.

Surrounding the take-up spool 5 is a cam device 15 having two similar faces 16 and 17 which are joined together at their highest and lowest points thereby forming a single continuous guiding surface. The highest point 18 of the cam surfaces 16 and 17 is slightly beyond the outer end of the spool 5, while the lower point 19 of the cam surfaces terminates at the inner end of the spool 5. This cam 15 is carried by a sleeve 20 which is rotatably mounted upon the spindle 6 and carries a gear 21 meshing with a pinion 22 on an idler shaft 23. Secured to this idler shaft 23 is a gear 24 which meshes with a pinion 25 carried upon the spindle 6. The arrangement of the gears and pinions 21, 22, 24, and 25 is such that the sleeve 20 carrying the cam 15 will be driven at about one-twentieth of the speed of and in the same direction as the spindle 6.

A guide pulley 30 located outside the cam 15 and beyond the inner end of the spool 5 is adapted to lead the cord or strand 31 over the cam faces 16 and 17 onto the spool 5.

The relation of this guide pulley 30 to the cam 15 and the spool 5 is such that the cord or strand 31 will always be pulling against one or the other cam faces 16 or 17 of the cam 15.

In the operation of the device it will be assumed that the spool 5 is rotating in a clockwise direction which will also be the direction of rotation of the cam 15. As the spool 5 and the cam 15 rotate, the wire or strand 31 pulling against the cam faces 16 and 17 will be laid upon the spool in smooth, even layers—two layers to each complete revolution of the cam 15, one while the strand is in engagement with the cam surface 16, the other while it is in engagement with the cam surface 17. Due to the fact that the high point 18 of the cam 15 is slightly beyond the outer end of the spool 5, it will force the cord or strand 31 against the outer end of the spool 5, and the relation of the lower point 19 of the cam 15 with respect to the inner end of the spool 5 is such that the cord or strand will also be laid closely against this head when the strand is in engagement with the lower point 19 and the cam.

The advantages of a spooling device of the character described is that it is constantly rotating in the same direction, thereby avoiding the sudden starts and stops which are present in the ordinary reverse movement spooling devices. By making the cam faces 16 and 17 smooth the cord or strand 31 may be guided back and forth across the length of the spool 5 in smooth even layers while traveling at a very high rate of speed and without putting any appreciable tension on the strand aside from that put upon it by the spool.

What is claimed is:

1. In a winding mechanism, a winding spool, a rotatable spooling device having a single continuous guiding surface thereon and surrounding said winding spool, means for rotating said spooling device, and means for maintaining a pressure of the strand upon the guiding surface of the spooling device whereby the strand will be supported and laid upon the winding spool in smooth even layers by said guiding surface.

2. In a winding mechanism, a winding spool, a rotatable spooling device having a single continuous guiding surface thereon and surrounding said winding spool, means for rotating the spooling device, and means for leading the strand to the spool at an angle whereby it will always pull against the guiding surface.

3. In a winding mechanism, a winding spool, a spooling device having a single continuous guiding surface from one end of the spool to the other and back and mounted concentrically of said spool, means for rotating said spooling device, and means for maintaining a constant pressure of the strand upon the guiding surface whereby the rotation of the spooling device will support and lay the strand upon the spool in smooth even layers.

4. In a winding mechanism for strands, a winding spool, a spindle upon which said spool is supported, driving mechanism connected with said spindle, a spooling device surrounding said spool, a sleeve carrying said spooling device and rotatably mounted upon said spindle, and reduction gears between said spindle and said sleeve to drive said sleeve at a lower rate of speed than the speed of said spindle.

5. In a winding mechanism for strands, a winding spool, a rotatable spooling device surrounding said spool and provided with a single continuous guiding surface, and a roller associated therewith and over which the strand travels adapted to maintain a strand in engagement with said guiding surface and under tension whereby the strand will be supported by and laid upon the spool in smooth, even layers by said guiding surface.

In witness whereof, I hereunto subscribe my name this 28th day of September A. D. 1918.

CHARLES JOHN DE COSTER.